(12) United States Patent
Chu

(10) Patent No.: US 6,374,210 B1
(45) Date of Patent: Apr. 16, 2002

(54) AUTOMATIC SEGMENTATION OF A TEXT

(75) Inventor: Ya-Cherng Chu, Taipei (TW)

(73) Assignee: U.S. Philips Corporation, New York, NY (US)

( * ) Notice: Subject to any disclaimer, the term of this patent is extended or adjusted under 35 U.S.C. 154(b) by 0 days.

(21) Appl. No.: 09/449,231

(22) Filed: Nov. 24, 1999

(30) Foreign Application Priority Data

Nov. 30, 1998 (EP) .............................................. 98204038

(51) Int. Cl.[7] .............................................. G06F 17/27
(52) U.S. Cl. ...................................................... 704/9
(58) Field of Search ........................ 704/1, 9–10, 257, 704/255, 256; 707/530, 531, 534, 535

(56) References Cited

U.S. PATENT DOCUMENTS

| | | | |
|---|---|---|---|
| 5,268,840 A | 12/1993 | Chang et al. ................. | 704/9 |
| 5,448,474 A | 9/1995 | Zamora ......................... | 704/9 |
| 5,806,021 A * | 9/1998 | Chen et al. .................... | 704/9 |
| 5,946,648 A * | 8/1999 | Halstead, Jr. et al. .......... | 704/9 |
| 6,035,268 A * | 3/2000 | Carus et al. ................... | 704/9 |

* cited by examiner

Primary Examiner—Patrick N. Edouard
(74) Attorney, Agent, or Firm—Daniel J. Piotrowski

(57) ABSTRACT

A system 100 is capable of segmenting a connected text, such as Japanese or Chinese sentence, into words. The system includes means 110 for reading an input string representing the connected text. Segmentation means 120 identifies at least one word sequence in the connected text by building a tree structure representing word sequence(s) in the input string in an iterative manner. Initially the input string is taken as a working string. Each word of a dictionary 122 is compared with the beginning of the working string. A match is represented by a node in the tree, and the process is continued with the remaining part of the input string. The system further includes means 130 for outputting at least one of the identified word sequences. A language model may be used to select between candidate sequences. Preferably the system is used in a speech recognition system to update the lexicon based on representative texts.

12 Claims, 5 Drawing Sheets

AUTOMATIC SEGMENTATION OF A TEXT

The invention relates to a method of segmenting a connected text into words, including the steps of reading an input string representing the connected text; identifying at least one sequence of isolated words in the input string by comparing the input string to words in a dictionary; and outputting at least one of the identified word sequences.

The invention farther relates to a system for segmenting a connected text into words; the system including means for reading an input string representing the connected text; means for identifying at least one sequence of isolated words in the input string by comparing the input string to words in a dictionary; and means for outputting at least one of the identified word sequences.

Increasingly advanced natural language processing techniques are used in data processing systems, such as speech processing systems, handwriting/optical character recognition systems, automatic translation systems, or for spell/grammar checking in word processing systems. Such systems frequently use statistical information relating to individual words or word sequences. The statistical information is obtained by analyzing large text corpora. For the analysis, individual words need to be identified in the text. In many languages, including the western languages, words are separated by boundary markers, such as a space or other punctuation marks, making identification easy. However, many other languages do not have boundary markers between words. Examples of such languages are many Asian languages such as Chinese, Japanese, and Hangul. Such languages are sometimes referred as agglutinative languages. Typically, these languages are written using special characters ("ideographs"), which each represent one or more syllables and usually a concept or meaningful unit. A word consists of one or more of these characters. A reader of a text in such a language must identify the boundaries of those words to make sense of the text. For many applications only one sequence of words must be identified.

From U.S. Pat. No. 5,448,474 a method and system for isolation of Chinese words from connected Chinese text is known. In this system a dictionary lookup process is performed, where all substrings of a text are identified. For each character of the text, it is checked for each word of the dictionary whether the word matches the text starting at that position. As an example, for the text "software", at position 0 (first character of the text) a match is found for the words "so", "soft", and "software"; at position 1 for the words "of" and "oft"; at position 4 for "war" and "ware"; at position 5 for "a" and "are"; and at position 6 for "re". For each match an entry is created in a table. The entry comprises the matching word, the position of the text at which the match starts, and the length of the word. If at a position no matching word is found, an entry is made in the table containing the individual character. In this way all possible words and unmatched characters are added to the table. Next, the number of entries in the table is reduced, based on criteria such as that a word must start adjacent to the end of a preceding word and must end adjacent to the start of a next word. Since in this way overlapping words (which are not adjacent) will be removed, parts of the text may not be covered by identified words. A separate restoration process is performed to correct undesired deletion of overlapping words, based on a criterion to keep the longest matching overlapping word. Finally, again all words are removed which are not adjacent the end or beginning of the text or another non-deleted word. The final outcome may contain several possible word sequences. Information regarding the frequency of occurrence of words in general texts may be used to select one of the sequences. For instance, a sequence with a two-character Chinese word may be selected above a same sequence with the two characters represented by two single-character words, since two character words are more common than single character words.

The known isolation procedure is complex and requires a restoration process to correct wrong deletions.

It is an object of the invention to provide a method and system of the kind set forth, which is more efficient.

To meet the object of the invention, the method is characterized in that the step of identifying at least one word sequence includes building a tree structure representing word sequence(s) in the input string in an iterative manner by:

taking the input string as a working string;
for each word of a dictionary:
  comparing the word with a beginning of the working string; and
  if the word matches the beginning of the working string:
    forming a node in the tree representing the word;
    associating with the node a part of the input string which starts at a position immediately adjacent an end position of the word; and
    forming a sub-tree, linked to the node, representing word sequence(s) in the part of the input string associated with the node by using the associated part as the working string.

By building a tree structure, analyzing the input string automatically results in identifying only words which are adjacent to a preceding word. All identified word sequences of which the last word ends at the end of the input string are in principle possible. In this way words which are not possible (in view of preceding words) are not considered as candidates. This reduces the amount of data to be processed. Moreover, complex procedures of deleting words and reintroducing overlaps are not required. Segmenting the sample string "software" according to the invention results in a logical tree structure with two main branches, one branch having a single node representing the word "software" and one branch having two linked nodes representing the words "soft" and "ware" respectively. Consequently only three entries are required instead of 10 in the prior art system.

In an embodiment according to the invention as described in the dependent claim 2, a plurality of new words are added with different lengths if a predetermined criterion is met. By adding an unknown sequence of characters not just as single character words to a data structure, it becomes possible to identify multi-character new words in a simple way. This makes the procedure suitable for languages, such as Japanese, wherein many single characters do not represent a word. Furthermore, it allows identifying a multi-character word as the preferred new word in which case the single character words do not need to be entered to the dictionary. In this way it is avoided that the dictionary gets 'polluted' with single character words. Having many single character entries in a dictionary reduces the chance of a correct segmentation of the text into words. As an example, the text "thisbook" might get segmented into the sequence of words "t", "his", and "book" if the single character "t" is in the dictionary.

In an embodiment according to the invention as described in the dependent claim 3 such criterion is a global decision based on whether or not a word sequence could be identified using the existing dictionary. If no sequence could be identified, new words are added. This test may be performed by first building a tree structure using only known words of the existing dictionary, and after the tree has been build verifying whether at least one path represents a word sequence which matches the entire input string. The verification can be very simple by during the building of the tree structure setting a parameter (end-of-string-reached) as soon as a first path through the tree has reached the end of the input string.

In an embodiment as defined in the dependent claim 4, the new words are added to one or more end nodes of paths whose corresponding word sequences do not match the entire input string. Such nodes may simply be located by following paths through the tree and verifying if the end node of the path corresponds to the end of the input string (i.e. the words match as well as the location in the string. This can be checked in a simple manner by verifying whether the part of the input string associated with the end node is empty, indicating that matching words have been found along the entire string). In a preferred embodiment, a global decision is taken whether or not to add new words (as described above). If new words are to be added, the tree structure is re-built. During the re-building of the tree, nodes to add new words to are found at those places in the tree where no word of the dictionary matches the remaining part of the input string (and not the entire string has been processed yet).

In an embodiment as defined in the dependent claim 5, it is calculated how many words match the beginning of the working string. If this number is below a threshold, then new words are added. How many new words are added may depend on the number of matching words found, where preferably more new words are added if few matches were found. In this way, a desired number of alternatives in word sequences can be created. In an embodiment as defined in the dependent claim 6, as an extreme the threshold may be one, resulting in new words being added if not a single word of the existing dictionary matched the beginning of the working string. The embodiment of claims 5 and 6 are preferably used for taking local decisions in the tree, in the sense that for each branch in the tree it is decided whether or not to add (more) new words.

In an alternative embodiment for taking local decisions as defined in the dependent claim 7, the number of new words already in a path are taken as a measure for determining whether new words need to be added. In an 'ideal' scenario, if for the first time in a path a new word is required only one or a few new words are added, which indeed all are possible (from the perspective of a human reader) In reality many candidates each having a different length may need to be tested. Some wrong candidate words can cause a misalignment in identifying words in the remainder of the string. Without special measures such a misalignment would result in adding further new words (possibly followed by further new words, etc.). By allowing, for instance, two or three new words in a path it is avoided that the tree expands rapidly with many sequences which are caused by wrong new words.

In an alternative embodiment for taking local decisions as defined in the dependent claim 8, the likelihood of the word sequences (and corresponding paths through the tree) are calculated. If the likelihood drops too low, the path is no longer extended. In this way, unrealistic segmentations, which may include new words, are not considered further. Advantageously, the threshold is dynamically established to ensure a relative ranking. If already one or more sequences have been identified (with a calculated likelihood) other sequences are only processed as long as the sequence has a higher likelihood. Preferably, a new word is given a relatively low likelihood, where the likelihood may depend on the length of the new word. In this way the likelihood of a word sequence decreases with the number of new words in the sequence, as defined in the dependent claim 9. In this way it is avoided that a wrong choice of a new word (which results in the remainder of the string also being misaligned and requiring further new words) results in a continuously expanding tree with many new words.

According to an embodiment as defined in the dependent claim 10, the length of new words is restricted to K characters, K>1. Preferably K equals five, ensuring that, particularly for Asian languages with mainly short words, most words can be identified without building an excessively large tree.

According to an embodiment as defined in the dependent claim 11, a path in the tree is only considered to represent a valid segmentation if the last word of the path ends aligned with the ending of the input string. This allows identifying valid sequences by backtracing starting only from those end nodes (leaves) in the tree whose associated word is aligned with the ending of the input string.

According to an embodiment as defined in the dependent claim 12, a statistical N-gram language model is used for determining a most likely path through the tree. In this way a founded decision is taken to select a most likely sequence from several possible sequences. The words of this sequence are output as representing the segmented text. Particularly if the method is used for building a lexicon (vocabulary and/or language model) for speech recognition systems, it is preferred that the already present default lexicon with its N-gram language model is used. Preferably a 2-gram or 3-gram is used if the vocabulary is large (e.g. over 10,000 entries).

To meet the object of the invention, the system is characterized in that in that the means for identifying at least one word sequence is operative to build tree structure representing word sequencers) in the input string in an iterative manner by:
    taking the input string as a working string;
    for each word of a dictionary:
        comparing the word with a beginning of the working string; and
        if the word matches the beginning of the working string:
            forming a node in the tree representing the word;
            associating with the node a part of the input string which starts at a position immediately adjacent an end position of the word; and
            forming a sub-tree, linked to the node, representing word sequence(s) in the part of the input string associated with the node by using the associated part as the working string.

These and other aspects of the invention will be apparent from and elucidated with reference to the embodiments shown in the drawings.

For ease of explanation many of the examples of segmenting text into words are given for texts expressed in Latin characters. In reality the languages involved use different character symbols, such as Katakana or Hiragana.

Figure 1:
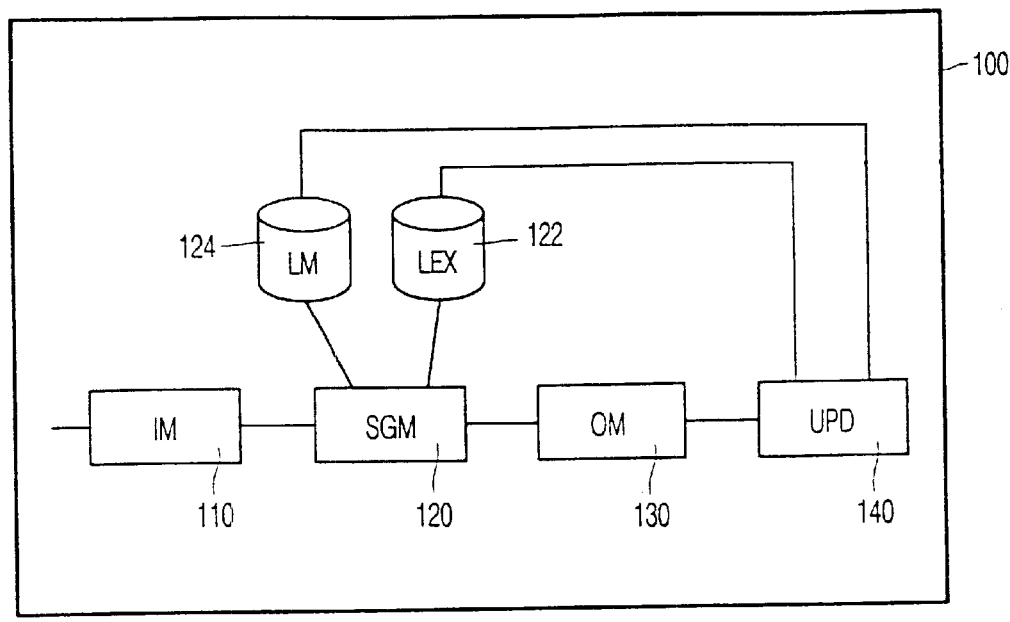
FIG. 1 illustrates a block diagram of the system according to the invention.

FIG. 1 shows a block diagram of the system 100 according to the invention. The system 100 includes input means 110 for receiving an input string which represents a connected text. The string may represent a phrase, a sentence, or a larger text of multiple sentences. In Asian languages, such as Japanese or Chinese, sentences are separated by a separating character. For such languages larger texts are preferably segmented on a sentence basis. To this end, a larger text is first segmented into sentences, using the sentence separator to identify the sentences, and the individual sentences are segmented using the method according to the invention. Typically the input string will be read from a text file. If desired the file may be converted to a common format, using a built-in or external converter. The text may also be retrieved from a hard-copy document, for instance by scanning the document and using OCR techniques to recognize a character string.

The system further includes identification means 120 for segmenting the input string into one or more word sequences. Typically, the identification means 120 is implemented in software, executed on a suitable processor such as a PC or workstation processor. The identification means 120 uses a lexicon (dictionary) 122 and optionally also a language model 124 for the segmenting. It is assumed that the vocabulary for the lexicon 122 and language model 124 is based on isolated words of a specific language. The system may support different vocabularies for different languages. The size of the vocabulary may vary for the size and complexity of the system. Output means 130 are used for outputting at least one of the identified word sequences. In many situations it will be preferred to output only one (or a few) word sequences. It will be appreciated that the method and system according to the invention can also be used for applications wherein it is desired to analyze several or all of the possible word candidates, for instance for generating an automatic index.

Figure 2:
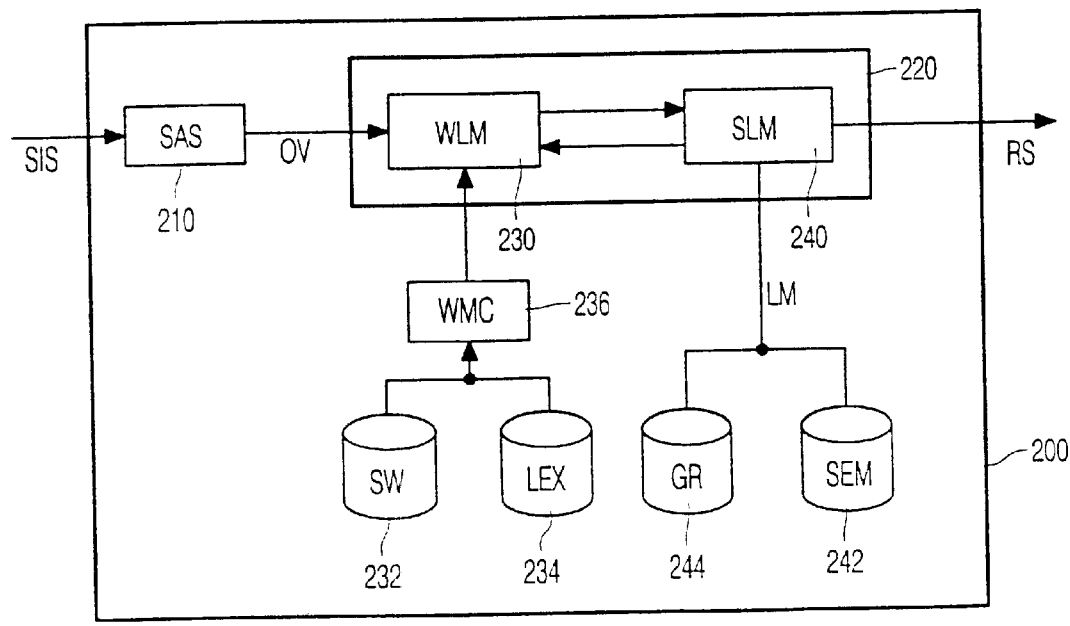
FIG. 2 shows a block diagram of a speech recognition system.
Figure 3A:
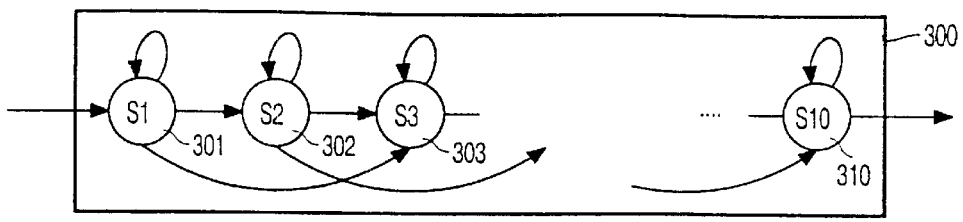
FIG. 3 shows Hidden Markov Models for modeling word or sub-word units.
Figure 3B:
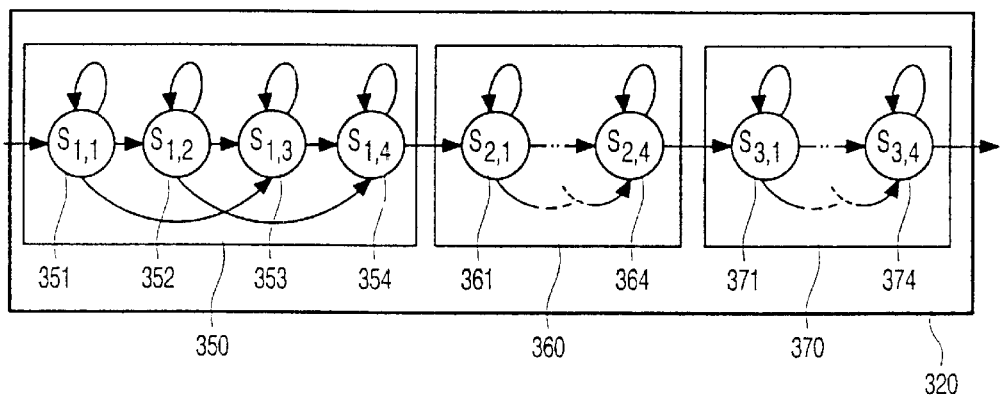

Preferably, the method and system are used for pattern recognition, such as large vocabulary continuous speech recognition or handwriting recognition systems, where a vocabulary is used to recognize words and a language model may be used to improve the basic recognition result. Since techniques used for pattern recognition can also be advantageously employed for the segmenting according to the invention, first a description of a pattern recognition system is given. FIG. 2 illustrates a continuous speech recognition system 200 which comprises a spectral analysis subsystem 210 and a unit matching subsystem 220 [refer L. Rabiner, B-H. Juang, "Fundamentals of speech recognition", Prentice Hall 1993, pages 434 to 454]. In the spectral analysis subsystem 210 the speech input signal (SIS) is spectrally and/or temporally analyzed to calculate a representative vector of features (observation vector, OV). Typically, the speech signal is digitized (e.g. sampled at a rate of 6.67 kHz.) and pre-processed, for instance by applying pre-emphasis. Consecutive samples are grouped (blocked) into frames, corresponding to, for instance, 32 msec. of speech signal. Successive frames partially overlap, for instance, 16 msec. Often the Linear Predictive Coding (LPC) spectral analysis method is used to calculate for each frame a representative vector of features (observation vector). The feature vector may, for instance, have 24, 32 or 63 components. In the unit matching subsystem 220, the observation vectors are matched against an inventory of speech recognition units. A speech recognition unit is represented by a sequence of acoustic references. Various forms of speech recognition units may be used. As an example, a whole word or even a group of words may be represented by one speech recognition unit. A word model (WM) provides for each word of a given vocabulary a transcription in a sequence of acoustic references. For systems, wherein a whole word is represented by a speech recognition unit, a direct relationship exists between the word model and the speech recognition unit. Other systems, in particular large vocabulary systems, may use for the speech recognition unit linguistically based sub-word units, such as phones, diphones or syllables, as well as derivative units, such as fenenes and fenones. For such systems, a word model is given by a lexicon 234, describing the sequence of sub-word units relating to a word of the vocabulary, and the sub-word models 232, describing sequences of acoustic references of the involved speech recognition unit. A word model composer 236 composes the word model based on the subword model 232 and the lexicon 234. FIG. 3A illustrates a word model 300 for a system based on whole-word speech recognition units, where the speech recognition unit of the shown word is modeled using a sequence of ten acoustic references (301 to 310). FIG. 3B illustrates a word model 320 for a system based on sub-word units, where the shown word is modeled by a sequence of three sub-word models (350, 360 and 370), each with a sequence of four acoustic references (351, 352, 353, 354; 361 to 364; 371 to 374). The word models shown in FIG. 3 are based on Hidden Markov Models, which are widely used to stochastically model speech and handwriting signals. Using this model, each recognition unit (word model or subword model) is typically characterized by an HMM, whose parameters are estimated from a training set of data. For large vocabulary speech recognition systems involving, for instance, 10,000 to 60,000 words, usually a limited set of, for instance 40, sub-word units is used, since it would require a lot of training data to adequately train an HMM for larger units. A HMM state corresponds to an acoustic reference (for speech recognition) or an allographic reference (for handwriting recognition). Various techniques are known for modeling a reference, including discrete or continuous probability densities.

A word level matching system 230 as shown in FIG. 2 matches the observation vectors against all sequences of speech recognition units and provides the likelihoods of a match between the vector and a sequence. If sub-word units are used, constraints are placed on the matching by using the lexicon 234 to limit the possible sequence of sub-word units to sequences in the lexicon 234. This reduces the outcome to possible sequences of words. A sentence level matching system 240 uses a language model (LM) to place further constraints on the matching so that the paths investigated are those corresponding to word sequences which are proper sequences as specified by the language model. In this way, the outcome of the unit matching subsystem 220 is a recognized sentence (RS). The language model used in pattern recognition may include syntactical and/or semantical constraints 242 of the language and the recognition task. A language model based on syntactical constraints is usually referred to as a grammar 244.

Similar systems are known for recognizing handwriting. The language model used for a handwriting recognition system may in addition to or as an alternative to specifying word sequences specify character sequences.

The grammar 244 used by the language model provides the probability of a word sequence $W=w_1 w_2 w_3 \ldots w_q$, which in principle is given by:

$$P(W)=P(w_1)P(w_2|w_1).P(w_3|w_1w_2) \ldots P(w_q|w_1w_2w_3 \ldots w_q).$$

Since in practice it is infeasible to reliably estimate the conditional word probabilities for all words and all sequence lengths in a given language, N-gram word models are widely used. In an N-gram model, the term $P(w_j|w_1w_2w_3 \ldots w_{j-1})$ is approximated by $P(w_j|w_{j-N+1} \ldots w_{j-1})$. In practice, bigrams or trigrams are used. In a trigram, the term $P(w_j|w_1w_2w_3 \ldots w_{j-1})$ is approximated by $P(w_j|w_{j-2}w_{j-1})$. A way of automatically building an N-gram language model is to estimate the conditional probabilities $P(w_j|w_{j-N+1} \ldots w_{j-1})$ by a simple relative frequency: $F(w_{j-N+1} \ldots w_{j-1}w_j)/F(w_{j-N+1} \ldots w_{j-1})$, in which F is the number of occurrences of the string in its argument in the given textual training corpus. For the estimate to be reliable, $F(w_{j-N+1} \ldots w_{j-1}w_j)$ has to be substantial in the given corpus.

For pattern recognition it is desired that both the dictionary and the lexicon are based on words representative of texts to be recognized. This can be achieved by analyzing representative texts, extracting words from the texts and building a language model based on word or word-sequence frequencies. The segmenting according to the invention can advantageously be used for extracting the words from connected texts. For training the dictionary or lexicon of a pattern recognition system it is sufficient that the segmenting results in only one output sequence of words. If used in a pattern recognition system, the segmenting system 100 preferably also includes updating means 140 for incorporating new words in the output word sequence (i.e. words not yet in the lexicon 122) into the lexicon 122. Preferably, also the language model is updated, for instance to reflect the likelihood of the new words or word sequences including the new words as well as the likelihoods of known words or word sequences.

Figure 4:
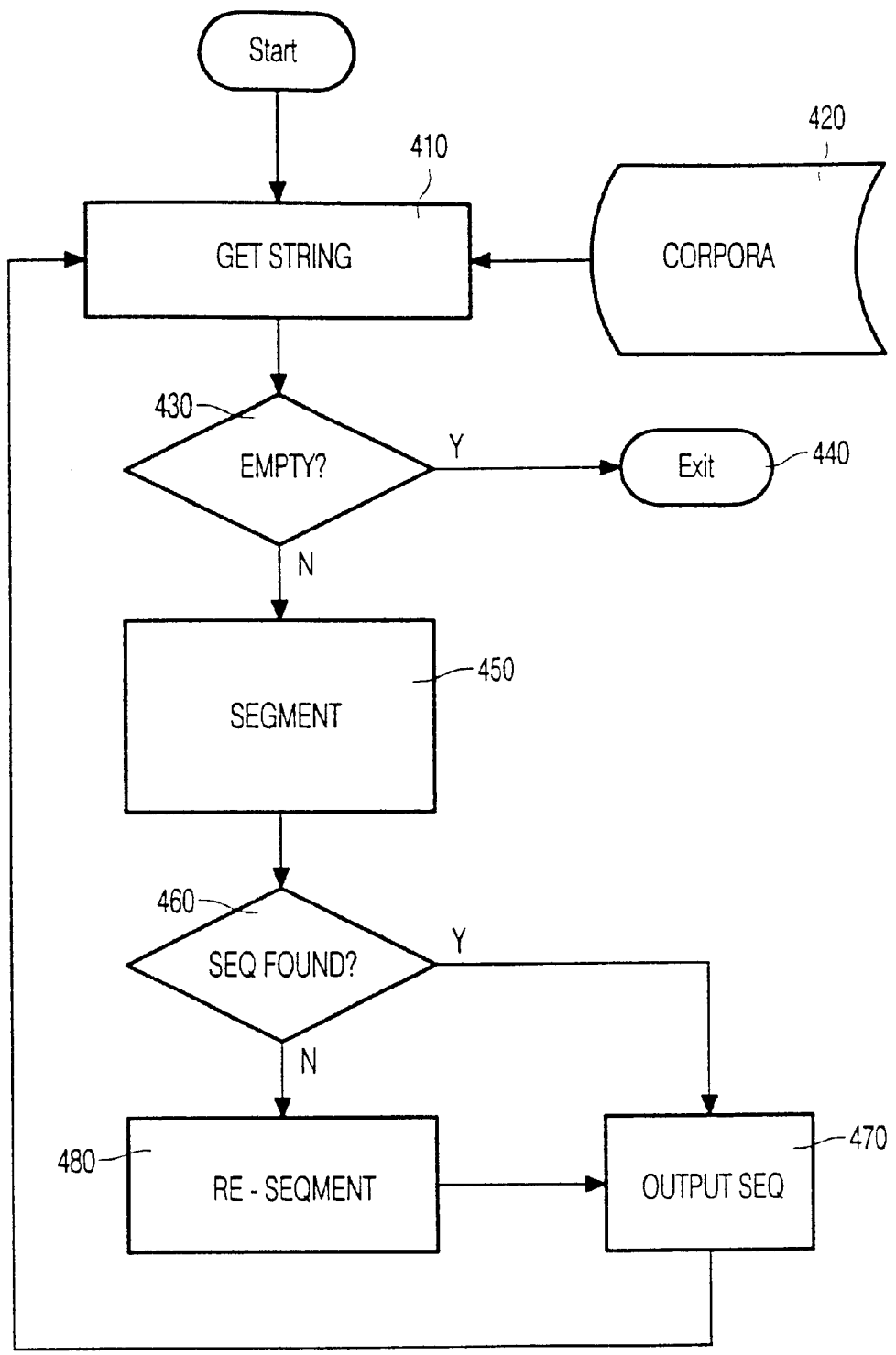
FIG. 4 shows a flow-diagram of a two-step approach segmenting approach with known words only and with new words.

According to the invention segmenting is performed by building a tree structure representing isolated word sequences of the input string. If the dictionary already contained all words of a text to be segmented, in principle no new words need to be added. Consequently, a word sequence may or may not include one or more new words. Since segmenting is more difficult and elaborate if new words need to be added, it is preferred to first determine whether the text can be segmented only using known words. The overall process is illustrated in FIG. 4. In step 410 an input string is retrieved from a text corpora 420. As described earlier, the string may represent a phrase, a sentence or a multiple-sentence text. In step 430 it is verified whether the entire corpora has been segmented yet. If so (the string is empty), the process exits at step 440. Otherwise, in step 450 the text is segmented using the given lexicon (known words only). This is preferably done by building a tree structure where each node represents a known word. Paths through the tree (representing a word sequence) which cannot be completed (no know word matches the remainder of the string) are terminated. Step 450 will be explained in more detail below with reference to FIG. 5. In step 460 it is checked whether the text could be segmented with known words only. This can be tested by verifying whether at least one path through the build tree completes (i.e. the word corresponding to the end node of a path matches the end character(s) of the string and is positioned at the end of the string). To this end the paths through the tree may be followed until a path is found corresponding to the entire string. Preferably, when during the building of the tree the end of the string is reached, this fact is stored for instance as an "end-of-string-reached" parameter. In this way verifying whether a path completes simply involves checking the stored information. If the test of step 460 indicates that the text could be segmented, the identified word sequence is output in step 470 and the process continues at step 410. If not, the process continues in step 480 with segmenting the string again but now allowing new words to be added. Step 480 will be explained in more detail below with reference to FIG. 6. It will be understood that a string identified in step 460 as being segmentable with known words in fact may also be segmentable using new word(s). A human reader of the text may prefer a segmentation including the new word(s), i.e. a word sequence with those new words appears more likely than the identified sequence with known words. This situation will rarely occur. Nevertheless, to deal with this situation without always segmenting the string with possible new words, it is preferred that optionally as part of step 460 the likelihood of a known word sequence is determined (e.g. using a N-gram language model) and if the likelihood is above a given threshold the text is identified as being segmentable with known words and, otherwise, the segmentation with new words is started.

Figure 5:
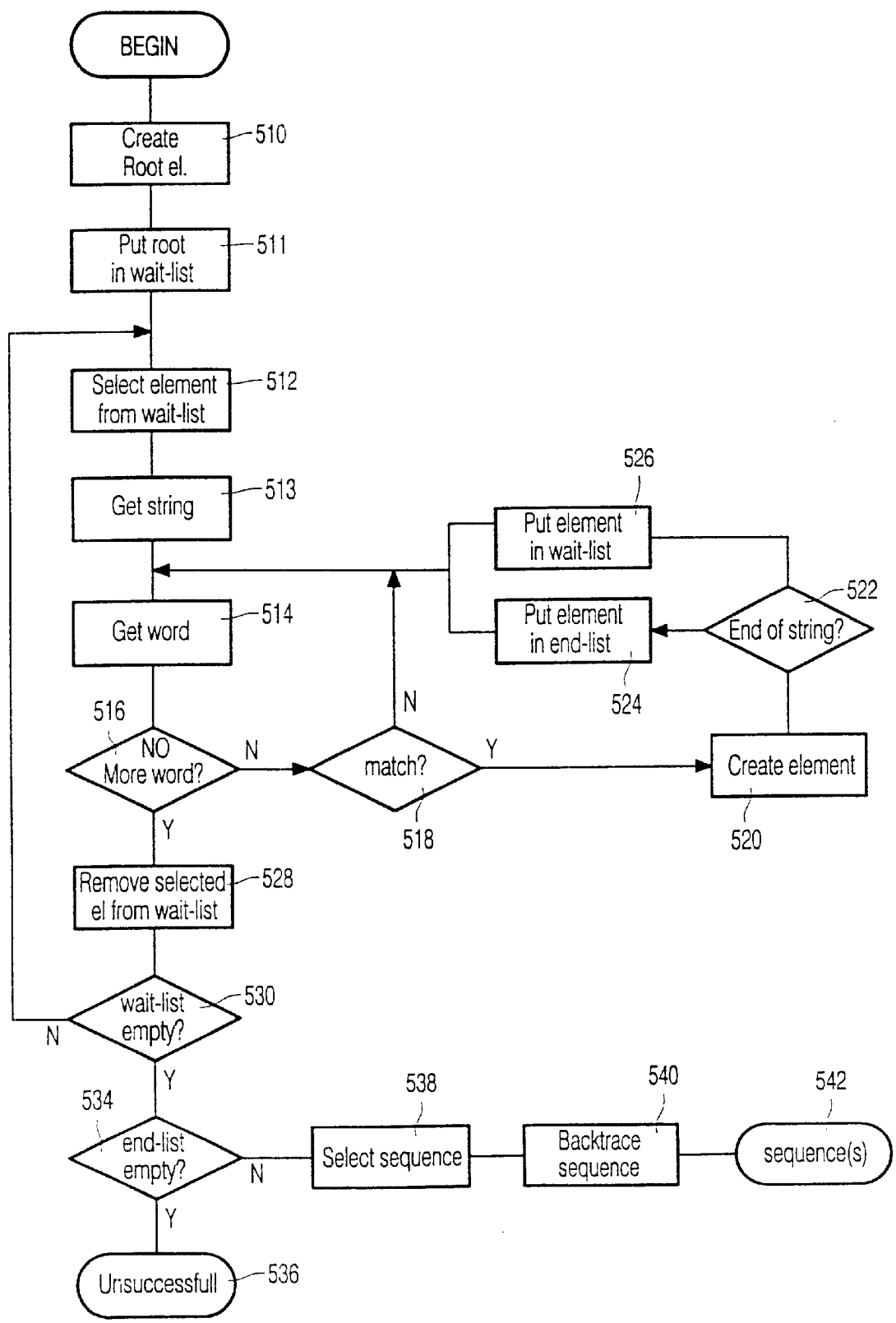
FIG. 5 shows a flow-diagram of a tree-based segmenting with known words.

FIG. 5 shows a flow diagram of segmenting the string with known words only. According to the invention a tree structure is built. In principle any suitable technique for building and representing a tree structure may be used. In the example of FIG. 5, the tree is represented by using a list of elements (representing the tree nodes) and links between the elements (pointer) (representing the path between the nodes). In the example, two lists are used. An end-list contains the elements which correspond to a word which matches and is aligned with the end of the input string. A wait-list contains the elements corresponding to a word which matches the string but is not aligned with the end of the input string. Each element is associated with an existing word of the dictionary. The association may be performed in any suitable way (e.g. copying the word and storing it in a data structure of the element or storing a reference (pointer or number) to an entry in the dictionary). Furthermore, each element is associated with a part of the input string which follows the word associated with the element. A special element is the root element, which is associated with the entire input string, but is not associated with any word. The root element serves to unite all possible word sequences. In practice, it is not necessary to have a separate root element. Instead, for each word of the dictionary which matches the beginning of the input string a new element can be created. The so-created elements serve as a first element of a word sequence. Steps 510 and 511 involve initializing the loops of the process. In step 510 the root element is created, and the input string is associated with the root element. In step 511 the root element is put in the wait-list. In step 512 an element of the wait-list is selected as the active element (consequently, the root element is selected as the initial active element). In step 512 the working string is loaded. The string associated with the currently active element of the wait-list is used as the working string. So, initially the entire input string is used as the working string since the input string is associated with the root element, which initially is the active wait-list element. In a loop, in step 514 and 516 all words of the dictionary are successively retrieved from the dictionary. The retrieving of a next word occurs in step 514. In step 516 it is tested whether still a word was retrieved (not all words have been tested yet). If so, in step 518 it is verified whether the word matches the beginning of the working string. If not the next word is retrieved in step 514.

If a match occurred, in step 520 a new element is created. The element is coupled to the word (e.g. the word is stored in association with the element), to the remainder of the working string (after removing the matched word from the beginning of the working string) and linked with the parent element (i.e. the element associated with the preceding word in the input string). For words matching the beginning of the input string, the root element serves as the parent element for the elements associated with the beginning words. In step 522 it is checked whether the end of the input string has been reached (i.e. whether the remainder of the working string is empty or not). If so, a path through the tree has ended and a word sequence has been found. To ensure that this sequence can be retrieved easily, the element is stored in the end-list in step 524. For systems in which it is sufficient to only identify one word sequence (not necessarily the most likely) the procedure can be exited as soon as the end of the string has been reached once. If the end of the string has not yet been retrieved, the element is stored in the wait-list (step 526). The remainder of the string will be segmented later on. In both cases the word has been dealt with (compared to the beginning of the working string), and a next word is retrieved at step 514. If for a working string all words of the dictionary have been compared to the beginning of the string, the loop is exited at step 516. In step 528, the currently selected element of the wait-list is removed from the wait-list, since the element has been fully dealt with. In an encompassing loop all working strings which have not yet been fully processed are dealt with. Each of such strings is represented by an element in the wait-list. Therefore, in step 530 it is checked whether the wait-list is empty. If not empty, a next element of the wait-list is selected as the currently active element in step 512. If the wait-list is empty, the original input string has been fully segmented (far as far as possible with known words only). In step 534 it is checked whether the end-list contains any entries. If not, in step 536 it is returned that segmentation with known words only was not successful. If the end-list was not empty, each of the elements on the end-list represents a word sequence. In fact, the elements are associated with the last word of the word sequence and are linked with the previous words of the sequence. This allows retrieval of the word sequence by backtracing in step 540 the linked elements starting from an element on the end-list. Instead of returning all identified word sequences, optionally in step 538 one or more of the word sequences are selected and returned in step 542. Preferably the selection is based on the likelihood of the paths. To this end advantageously a statistical N-gram language model is used for determining a most likely word sequence. Particularly if the segmenting takes place to improve the lexicon and/or language model of a pattern recognition system, the already existing language model can be used. Preferably a bigram or trigram language model is used for a large vocabulary pattern recognition system (e.g. over 10,000 entries).

According to the invention a plurality of new words with different lengths are added to the tree structure if a predetermined criterion is met. In an embodiment, the new words are added to one or more end nodes of paths whose corresponding word sequences do not match the entire input string. The method as illustrated in FIG. 5 may be used to build a basic tree structure. If, for instance, afterwards it appears that no suitable segmentation has been found using known words, the nodes to which new words need to be added may simply be located by following paths through the tree and verifying if the end node of the path corresponds to the end of the input string (i.e. the words match and the segmentation has reached the end of the input string). Using the technique of FIG. 5, a double link may be maintained between the elements, one link for linking the child to the parent (as before) and an additional link for linking the parent to the child. In this way paths can be followed through the tree starting from the root. For an end node of a path it can then be checked whether the end node of a path is on the end-list. If not, new words may be added to the end node. Instead of tracing paths through the tree, also a third list may be introduced, representing end nodes of a path where the string corresponding to the end node is not empty (i.e. no known word matches the beginning of the remainder of the input string). This can be achieved by verifying in step 528 whether at least one match was found. If not, the element is put from the wait-list onto the third-list representing incomplete segmentations. Once the nodes have been located, new words may be created and represented as elements in the tree as will be described with more detail with reference to FIG. 6. By putting the elements on the wait-list, the remaining part of the tree can be created in a same way as described for FIG. 5 for the know.word segmentation.

Figure 6:
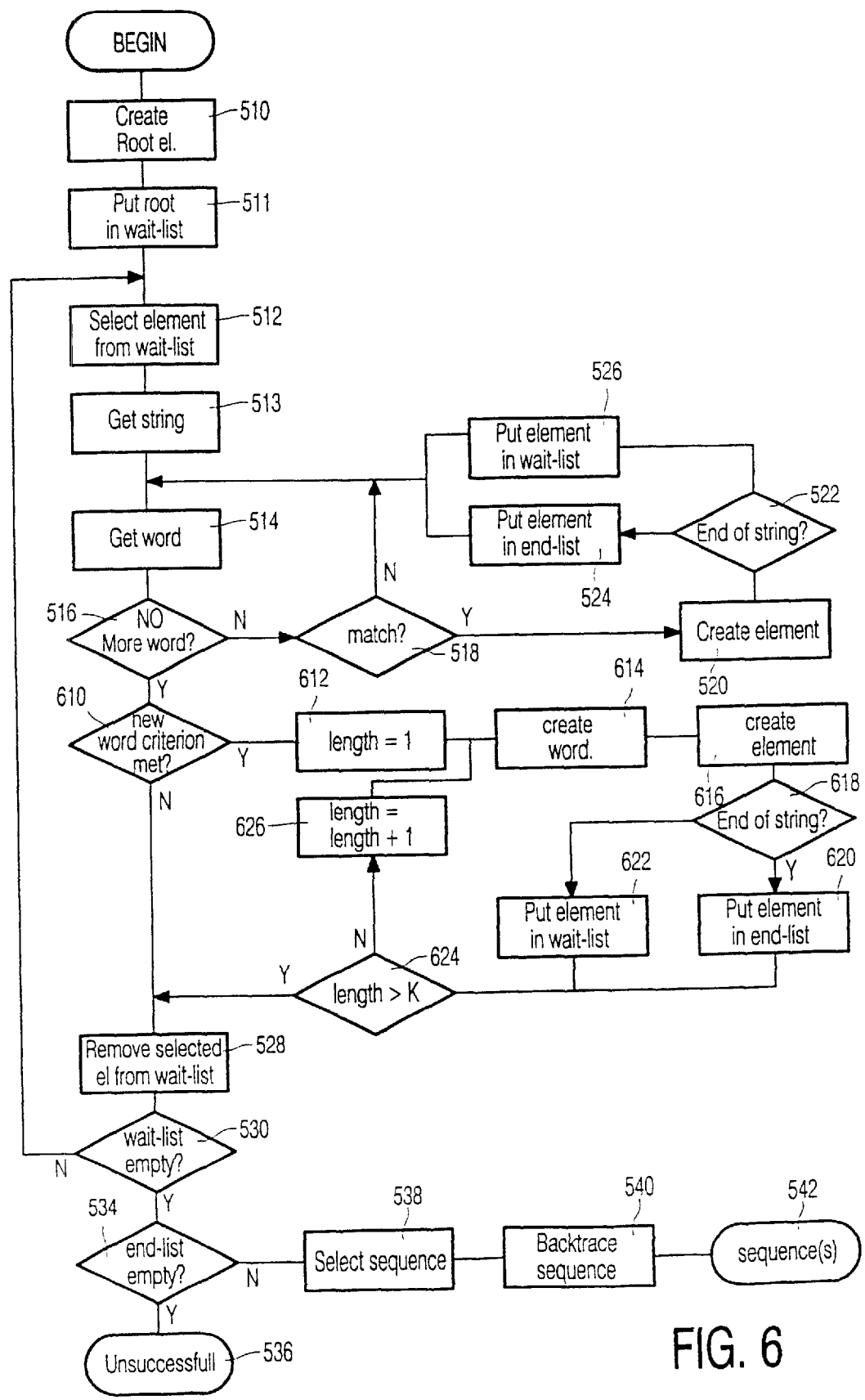
FIG. 6 shows a flow-diagram of a tree-based segmenting with new words.

FIG. 6 shows a preferred way for segmenting the input string. In this embodiment, identification of known words and adding of new words takes place in an integrated manner. Items which correspond to the same items of FIG. 5 are indicated by the same number as used in FIG. 5. Those items are not described in further detail. If after step 516 all words have been matched against the beginning of the working string, in step 610 a predetermined criterion is used to determine whether new words need to be added. If new words need to be added, in step 612 a length of the new word is initialized (in the example to 1). In step 614 a word of that length is created, by copying that number of characters from the beginning of the string. In a same way as described for step 520, 522, 524, and 526 a corresponding element is created in step 616 and associated with the word, the parent node and the remainder of the string. The element is put into the wait-list (step 622) or the end-list (step 620) in dependence on whether the end of the string has been reached. In step 624 it is checked whether all desired new words up to a maximum length K have been created, K being at least 2. If not, in step 626 the length is increased and in step 614 a new word is created. If all new words have been created, the process in continued as in FIG. 5 with step 528. For Asian language, K is preferably chosen between 3 and 6. If this does not result in a successful segmentation, advantageously K is increased.

In an embodiment according to the invention, the criterion being tested in step 610 is how many words match the beginning of the working string. This can be implemented by increasing a counter in step 520, which is reset as part of step 512 or 513. If the number of matching words is below a threshold, then new words are added. How many new words are added may depend on the number of matching words found, where preferably more new words are added if few matches were found. It will be appreciated that as an extreme the threshold may be one, resulting in new words being attached to a node of the tree if not a single word of the existing dictionary matched the beginning of the working string associated with that node.

In an alternative embodiment, the criterion is based on the number of new words already in a path. This can be implemented by incrementing a counter each time a new word is inserted in a path, and associating the counter with the end element of the path. Preferably, no more new words are added to a path if the path already includes two or three new words in a path. If, however, in this way no successful segmentation is achieved, the number of allowable new words in a path may be increased.

In an alternative embodiment, the criterion is based on the likelihood of the word sequences (and corresponding paths through the tree). Preferably, the likelihood of each word sequence is calculated as the corresponding path is being created. The accumulated score may be stored in association with the end element of the path. If as part of the test of step 610, the likelihood is below a threshold, the path is no longer extended: no new words are added to this path anymore. Advantageously, the likelihood threshold is dynamically established to ensure a relative ranking. If already one or more sequences have been identified (with a calculated likelihood) other sequences are only processed as long as the sequence has a higher or similar likelihood. Preferably, a new word is given a relatively low likelihood, where the likelihood may depend on the length of the new word. In this way the likelihood of a word sequence decreases with the number of new words in the sequence. Any suitable likelihood calculation may be used. The following likelihood score for a new word is preferred:

Unknown_word_score=penalty+weight*[min_unigram*char_no*unigram_weight+Length_prob*length_weight], where penalty is a fixed penalty value for every new word, weight is a global weighting factor for the new word score, min_unigram is the minimal occurrence frequency (unigram model) of all known words, char_no is the number of characters of the new word, unigram_weight is a local weighting factor for the unigram score, length_prob is the probability of a word of this length (length distribution probability)

length_weight is a local weighting factor for the length probability.

The penalty and weight parameters ensure that new words get a lower score than known words.

In a further embodiment according to the invention, if at step 610 it is determined that no word matches the beginning of the working string, then this is seen as an indication that at an earlier point a wrong segmentation may have occurred. For instance, a matching known word existed, whereas actually the characters were part of a new word. To this end the tree is backtraced, preferably only one step, and one or more new words are added to a the node which was located during the backtracing. Obviously no new words are added if those words had already been added. No new words need to be added either if at that location several matching known words were already found. In the latter case it may be assumed that at least one of these words will lead to a successful sequence.

What is claimed is:

1. A method of segmenting a connected text into words, including the steps of:
   reading an input string representing the connected text;
   identifying at least one sequence of isolated words in the input string by comparing the input string to words in a dictionary; and
   outputting at least one of the identified word sequences;
   characterized in that the step of identifying at least one word sequence includes building a tree structure representing word sequences) in the input string in an iterative manner by:
   taking the input string as a working string;
   for each word of a dictionary:
      comparing the word with a beginning of the working string; and
      if the word matches the beginning of the working string:
         forming a node in the tree representing the word;
         associating with the node a part of the input string which starts at a position immediately adjacent an end position of the word; and
         forming a sub-tree, linked to the node, representing word sequence(s) in the part of the input string associated with the node by using the associated part as the working string; wherein in dependence on a predetermined criterion deciding whether new words are to be added to the tree structure;
      if new words are to be added:
         selecting at least one node in the tree whose associated word is to be followed by new words;
         forming a plurality of new words; each of the new words matching a beginning of the input string part associated with the selected node and consisting of a different number of characters;
         for each formed new word forming a respective sub-tree linked to the selected node; each sub-tree representing word sequence(s) starting with the respective new word in the input string part associated with the selected node.

2. A method as claimed in claim 1, wherein the method includes checking whether at least one path through the tree structure represents a word sequence which matches the entire input string, where the word sequence includes only words of the dictionary; and deciding to add new words if the outcome is negative.

3. A method as claimed in claim 2, wherein the step of selecting at least one node in the tree whose associated word is to be followed by new words includes identifying at least one path through the tree representing a word sequence not matching the entire input string and using an end node of the identified path as the selected node.

4. A method as claimed in claim 1, wherein the method includes, for each working string:
   determining how many words of the dictionary match the beginning of the working string;
   deciding to add new words if the number of words of the dictionary matching the beginning of the working string is lower than a predetermined threshold; and
   selecting as the node in the tree whose associated word is to be followed by new words the node associated with the working string.

5. A method as claimed in claim 4, wherein the threshold is one.

6. A method as claimed in claim 1, wherein the method includes counting for each word sequence the number of new words in the sequence while building the tree structure and terminating extending the tree structure along a path representing the word sequence if the counted number of new words exceeds a predetermined threshold.

7. A method as claimed in claim 1, wherein the method includes calculating a likelihood for each word sequence while building the tree structure and terminating extending the tree structure along a path representing the word sequence if the likelihood of the corresponding word sequence is lower than a predetermined threshold.

8. A method as claimed in claim 7, wherein the likelihood of a word sequence decreases as a function of the number of new words in the word sequence.

9. A method as claimed in claim 1, characterized in that the step of forming new words comprises forming up to a K words, K>1, each word starting with the beginning character of the working string and, respectively, including one to K of the beginning characters of the working string.

10. A method as claimed in claim 1, characterized in that the step of outputting at least one of the word sequences represented by the tree includes selecting one of the paths through the tree, where only paths are considered of which a word represented by an end node of the path matches the end of the input string.

11. A method as claimed in 4, characterized in that the step of selecting one of the paths through the tree includes calculating a likelihood of each candidate path based on a statistical N-gram language model, where $N \geqq 2$ and selecting a most likely path.

12. A system for segmenting a connected text into words; the system including:
  means for reading an input string representing the connected text;
  means for identifying at least one sequence of isolated words in the input string by comparing the input string to words in a dictionary; and
  means for outputting at least one of the identified word sequences;
  characterized in that the means for identifying at least one word sequence is operative to build a tree structure representing word sequence(s) in the input string in an iterative manner by:
  taking the input string as a working string;
  for each word of a dictionary:
    comparing the word with a beginning of the working string; and
    if the word matches the beginning of the working string:
      forming a node in the tree representing the word;
      associating with the node a part of the input string which starts at a position immediately adjacent an end position of the word; and
      forming a sub-tree, linked to the node, representing word sequence(s) in the part of the input string associated with the node by using the associated part as the working string, wherein in dependence on a predetermined criterion deciding whether new words are to be added to the tree structure;
  if new words are to be added:
    selecting at least one node in the tree whose associated word is to be followed by new words;
    forming a plurality of new words; each of the new words matching a beginning of the input string part associated with the selected node and consisting of a different number of characters;
    for each formed new word forming a respective sub-tree linked to the selected node; each sub-tree representing word sequence(s) starting with the respective new word in the input string part associated with the selected node.

* * * * *